(12) United States Patent
Birgisson et al.

(10) Patent No.: US 7,786,192 B2
(45) Date of Patent: Aug. 31, 2010

(54) NANOMODIFIED CONCRETE ADDITIVE AND HIGH PERFORMANCE CEMENT PAST AND CONCRETE THEREFROM

(75) Inventors: Bjorn Birgisson, Gainesville, FL (US); Charles L. Beatty, Gainesville, FL (US)

(73) Assignee: University of Florida Research Foundation, Inc., Gainsville, FL (US)

( * ) Notice: Subject to any disclaimer, the term of this patent is extended or adjusted under 35 U.S.C. 154(b) by 437 days.

(21) Appl. No.: 11/777,410

(22) Filed: Jul. 13, 2007

(65) Prior Publication Data

US 2008/0242769 A1 Oct. 2, 2008

Related U.S. Application Data

(60) Provisional application No. 60/831,064, filed on Jul. 14, 2006.

(51) Int. Cl.
C04B 24/26 (2006.01)
C04B 28/02 (2006.01)
C08K 3/00 (2006.01)

(52) U.S. Cl. .................................. 524/5; 524/2; 524/4

(58) Field of Classification Search ..................... 524/5, 524/2, 4

See application file for complete search history.

(56) References Cited

U.S. PATENT DOCUMENTS 6,172,121 B1 1/2001 Chaiko
2003/0176537 A1* 9/2003 Chaiko ...................... 523/200

FOREIGN PATENT DOCUMENTS

| EP | 035757 | 4/1993 |
| JP | 2003 292792 | 10/2003 |
| WO | WO 96/40598 | 12/1996 |
| WO | WO 98/58887 | 12/1998 |
| WO | WO 01/40135 | 6/2001 |

OTHER PUBLICATIONS

Kim et al., Effect of micro organic-inorganic complex on the hydration of Portland cement, Amer. Chem. Soc., vol. 104, No. 4, Jan. 27, 1986.

* cited by examiner

*Primary Examiner*—Harold Y Pyon
*Assistant Examiner*—Angela C Scott
(74) *Attorney, Agent, or Firm*—Cantor Colburn, LLP

(57) ABSTRACT

A concrete additive for a reinforced concrete composite is provided. The additive can have an exfoliated clay having an exfoliated layered silicate plate comprising structure, and at least one of an oligomer or polymer linking at least a portion of said silicate plate comprising structure. The additive can have a dispersant between the silicate plates. The clay can include sodium or calcium montmorillonite or a phosphatic clay. The oligomer or polymer can include polyvinyl alcohol.

17 Claims, 7 Drawing Sheets

FIGURE 1: Effect of pozzolans on calcium hydroxide content in hcp.

FIGURE 2: Effect of pozzolans on permeability of hcp.

NANOMODIFIED CONCRETE ADDITIVE AND HIGH PERFORMANCE CEMENT PAST AND CONCRETE THEREFROM

CROSS-REFERENCE TO RELATED APPLICATIONS

The present application incorporates by reference and claims priority to U.S. Provisional Patent Application Ser. No. 60/831,064 filed Jul. 14, 2006, entitled "Nanomodified Concrete Additive and High Performance Cement Paste and Concrete Therefrom."

STATEMENT REGARDING FEDERALLY SPONSORED RESEARCH OR DEVELOPMENT

Not applicable.

FIELD OF THE INVENTION

The invention relates to polymer reinforced concretes and concrete additives.

BACKGROUND

Conventional concrete, as a construction material, suffers from a number of inherent deficiencies. The primary drawbacks relate to its lack of ductility, low tensile strength, and a tendency to undergo significant shrinkage during curing. The brittle nature of concrete has had a direct effect on the specifications and guidelines used in the design of concrete structures. Since the ultimate goal in the design of any structure is generally safety, there are a number of precautions that needed to be taken when formulating the design approaches used today. Chief among these is the avoidance of brittle failure modes.

If a structure were to fail in service, people inside that structure would be at great risk if they had insufficient warning to vacate the premises before collapse. If such a failure occurred instantaneously, as in brittle behavior, there would be no warning. Alternatively, if there was a large amount of deformation, movement and noise produced by the structure before failure (ductile), people would have time to get out. Current design codes recognize this dilemma and base their criteria around ductile failures. The question becomes how to force a brittle material (concrete) to fail in a ductile manner.

The behavior of typical concrete beam to which a uniform load is added is well known. When the load is applied, the beam deflects. This causes a shortening of the upper surface of the beam, resulting in compressive stresses in this region of the member as the material of the beam (i.e. concrete) tries to resist the change in shape. The bottom surface, on the other hand, is lengthened or stretched, resulting in an induced tensile stress as the concrete tries to resist elongation.

Concrete is relatively strong in compression but very weak in tension. If the beam were to be made entirely from concrete, it would fail at the bottom surface under a very low load, possibly even its own weight, and that failure would be very brittle in nature. Thus, something must be done to the lower portion of the beam to prevent the tensile stresses from failing the concrete.

This logic is the foundation for conventional reinforced concrete beam design. Generally, reinforcing bars are placed within the concrete beam, near the bottom, to carry tensile loads and alleviate the tensile stresses otherwise applied to the concrete. Steel, being much stronger than concrete in tension, is well suited for this application. In addition, steel fails in a very ductile manner, with very large amounts of elongation before failure. If this occurs within the concrete, a great deal of deformation and noise is generated, thus providing the warning necessary to save lives.

The basic theory behind conventional reinforced concrete beam design is well known. Essentially, steel reinforcement is placed near the bottom of the beam and is used to carry the tensile stresses while the concrete at the top of the beam carries the compressive stresses. To avoid failure of this concrete in compression, the steel is actually under-designed so that it will fail first. Thus, the concrete never reaches its ultimate capacity.

Furthermore, the concrete in the bottom portion of the beam is not even considered in the design since its strength is very low in tension, relative to the steel. Its job is simply to protect the steel from the surrounding environment by acting as a barrier to deleterious substances (e.g. seawater). Seawater will not significantly affect the concrete itself but can cause corrosion of the steel reinforcement, resulting in overall degradation of the structure. The effectiveness of this approach depends upon the inherent permeability of the concrete, which is directly dependant upon the presence and size of cracks. These cracks can and do occur because of such issues as shrinkage, overloading, fatigue loading, impact, and other durability mechanisms.

One method of improving both of these drawbacks (brittle failure mode, high permeability) is to provide reinforcement of the concrete matrix at a smaller scale than the steel bars. This is often done through the use of short fibers mixed into the concrete during batching. Fibers have the ability to improve durability by resisting crack opening and provide strength after initial cracking, thus improving the ductility of the concrete.

Permeability can also be improved by altering the concrete microstructure to produce a denser, less porous, arrangement of components. The most common approach to achieving this goal is the inclusion of a pozzolanic material in the concrete mix design.

Concrete is well known to be made up of two primary components; stone and sand aggregates surrounded by a hydrated cement paste (hcp) matrix. It is the latter which acts as the glue that binds the aggregates together. It is also the hcp that is the dominant factor when it comes to permeability, since the aggregates typically used in concrete tend to be far less permeable than the surrounding matrix.

Examining the hcp matrix reveals that there are two primary building blocks that make up its microstructure; calcium-silicate-hydrate (C—S—H) and calcium hydroxide. The C—S—H takes the form of very small crystals packed closely together to form a very dense structure. The calcium hydroxide, on the other hand, forms much larger, layered, plate-like crystals. These crystals do not pack well and tend to exhibit weakness between layers due to poor bonding. Ultimately, it is the calcium hydroxide that represents the weak link in both strength and permeability of hcp.

Pozzolanic materials are alumino-siliceous materials which reacts with calcium hydroxide in the presence of water to form compounds possessing cementitious properties at room temperature, producing calcium-silicate-hydrate (C—S—H). The end result is a significant reduction in porosity and permeability, accompanied by a corresponding increase in strength. Common pozzolans in use today include fly ash, silica fume, blast furnace slag, and high reactivity metakaolin.

Typical effects of commonly used pozzolanic materials on the amount of calcium hydroxide in concrete are shown in FIG. 1. The effect of this reduction in calcium hydroxide on permeability can be seen in FIG. 2, which shows the relative amounts of chlorides penetrating into different concretes after prolonged exposed to seawater.

Among the large number of clay types available, either natural or man-made, the polymerization of Montmorillonite (M-clay) has been the most actively studied. As defined herein and known in the art "clay" is a term used to describe a group of hydrous aluminium phyllosilicates minerals that are generally less than 2 μm in diameter that consist of a variety of phyllosilicate minerals rich in silicon and aluminium oxides and hydroxides which include variable amounts of structural water. There are three or four main groups of clays: kaolinite, montmorillonite-smectite, illite, and chlorite (chlorite is not always considered a part of the clays and is sometimes classified as a separate group, within the phyllosilicates). There are about thirty different types of "pure" clays in these categories but most "natural" clays are mixtures of these different types, along with other weathered minerals. Montmorillonite has a chemical formula of $(Na, Ca)_{0.33}(Al,Mg)_2Si_4O_{10}(OH)_2 \cdot nH_2O$.

SUMMARY OF THE INVENTION

Broadly stated, embodiments of the invention are directed to a nanomodified concrete additive and high performance cement paste and concrete made therefrom. A method of making the concrete composition is also provided.

The primary chemistry of M-clay can be very similar to conventionally used pozzolanic materials. M-clay can exhibit a layered silicate platelet structure. The advantage of this configuration over other small particles is that the multi-layer silicate structure can be penetrated between layers by small molecules forcing the silicate platelets apart (as shown below). This process is called intercalation. If the penetrating polymer molecules are reactive species, subsequent polymerization can result in complete separation of the silicate layers (i.e. exfoliation).

As a result of exfoliation, a small mass of M-clay can result in numerous small, thin (e.g. 20-nm) platelets, with a very large surface area, that are fully separated. The resulting polymer chains tends to bond to all of these surfaces, creating a linkage effect among the silicate platelets. This bonding can also be considered as a flocculated material since one polymer chain can link several clay particles together.

Normally, the exfoliation process requires that the polymer must wet the clay for it to be able to diffuse into the gallery (i.e., the spacing between silicate sheet layers). This process can be slow, and can require mechanical mixing.

In one embodiment, a reinforced concrete composite is provided that can have a cement matrix; an exfoliated clay having an exfoliated layered silicate plate comprising structure, and at least one of an oligomer or polymer linking at least a portion of said silicate plate comprising structure.

In another embodiment, a concrete additive is provided that can have a stable mixture including: an exfoliated clay having an exfoliated layered silicate plate comprising structure, and a dispersant between said silicate plates.

In yet another embodiment, a method of reinforcing a concrete composite is provided. The method can include providing a cement matrix; admixing an exfoliated clay to the cement matrix, wherein the exfoliated clay has an exfoliated layered silicate plate comprising structure; and linking at least a portion of said silicate plate comprising structure using an oligomer or polymer.

BRIEF DESCRIPTION OF THE DRAWINGS

A fuller understanding of the present invention and the features and benefits thereof will be obtained upon review of the following detailed description together with the accompanying drawings, in which.

DETAILED DESCRIPTION

Figure 1:
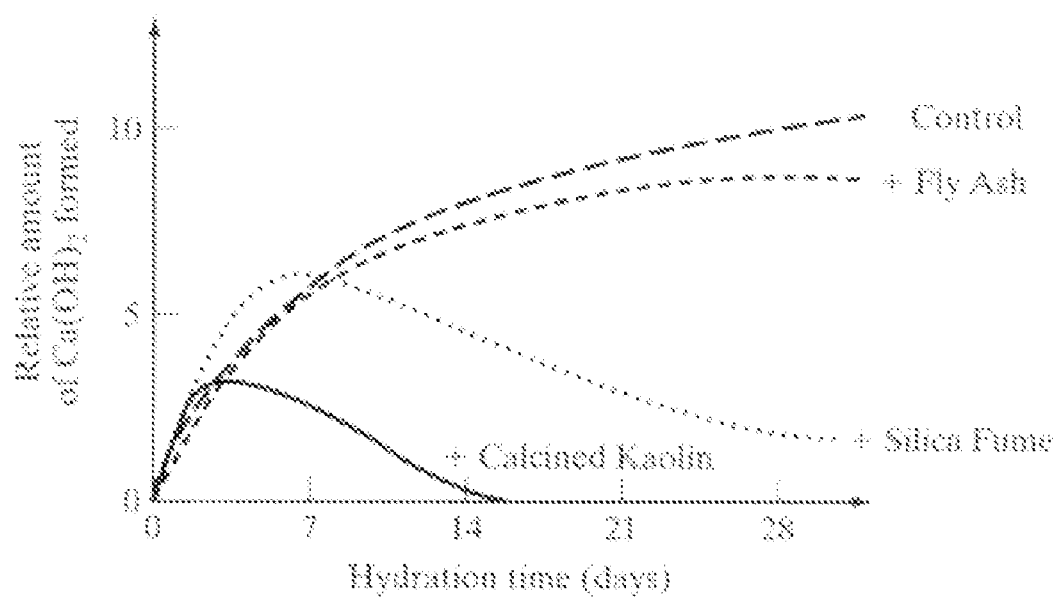
FIG. 1 shows typical effects of commonly used pozzolanic materials on the amount of calcium hydroxide in concrete.
Figure 2:
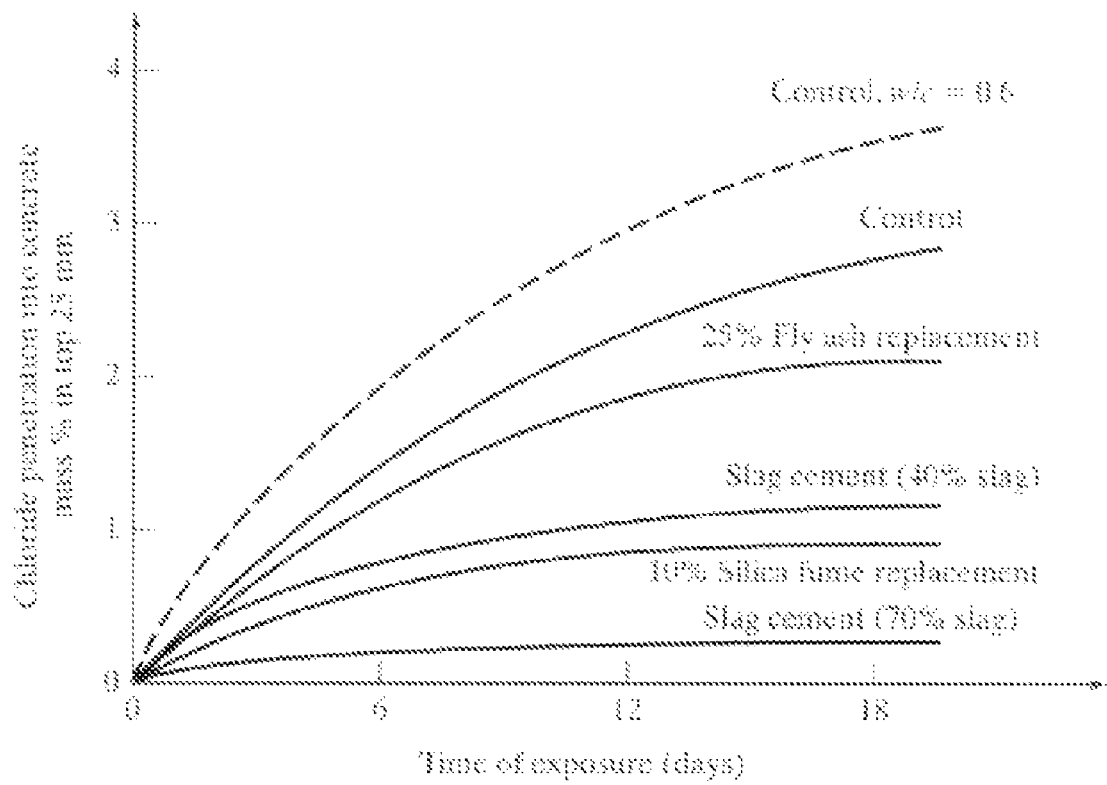
FIG. 2 shows the effect of various pozzolans on permeability of hcp.

A reinforced concrete composite can comprise a cement matrix, an exfoliated clay, and preferably can include an oligomer or polymer. The oligomer or polymer can link at least a portion of the exfoliated silicate platelets provided by the clay and can provide improved ductility and essentially eliminates shrinkage. The exemplary embodiments of the present disclosure can also be embodied as a concrete additive, comprising a stable mixture including an exfoliated clay having an exfoliated layered silicate comprising structure, and an optional an oligomer or polymer for linking at least a portion of the silicate comprising structure.

Preferred clays for use with the invention include sodium or calcium montmorillonite (Ex: CLOISITE NA$^+$) or phosphatic clays, including phosphatic waste clay, or mixtures thereof. Optionally, the concrete composite can include a dispersion agent that helps keep the clay in a dispersed state when stored as an additive to prevent, or at least limit, clumping of the clay.

The present disclosure provides polymers or oligomers such as PVA together with exfoliated clays to form stable admixtures. When these admixtures are added to a cement matrix form a high strength, as described below, high ductility concrete results. The repeat structure of PVA is:

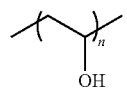

PVA in concrete reacts with (OH)— groups in the cement matrix, and thus participates in the hydration process forming a bond with the cement paste. The use of exfoliated clay as a pozzolan has been found to provide a significant advantage since 2 percent by weight of clay has been found to provide a strength increase in concrete that is equivalent to about 8 percent by weight of conventional silica fumes. Moreover, applied to concrete, the silicate platelets provided by the clay, being pozzolanic in nature, react with the calcium hydroxide crystals in the concrete matrix to produce C—S—H, providing all of the associated benefits (i.e. increased strength, reduced permeability). Additionally, these new C—S—H crystals form around the polymer chains, resulting in what is essentially a fiber reinforced concrete, though the reinforcing is at a scale and consistency never before achieved. The result of this latter effect is an increase in ductility of the concrete during failure.

As used herein, the term "cement matrix" can be a mixture of a hydratable cementitious binder (e.g., Portland cement), fine aggregate (sand), and coarse aggregate (crushed stone or gravel) to which water is added to provide a composition that can harden into a building structure (e.g., foundation) or a civil engineering structure (e.g., tunnel) or other structural component.

The new admixture product for concrete can result in increased ductility of concrete and reduced shrinkage during curing. The Inventors have discovered that the intercalation process can be achieved via time and temperature alone for selected reactive species on clays including raw ("as dug") M-clay, which is clay waste produced in phosphate mining (phosphatic clay) as well as sodium montmorillonite (clay) nanoparticles. M-clay can provide a plurality of nanosized montmorillonite clay particles. Introducing a clay together with an oligomer or polymer into the concrete mixture has been found to produce better contact with the aggregates leading to better concrete characteristics as there is a reduction of weak zones between the paste and aggregate.

As noted above, PVA reacts with hydroxide groups $(OH)^-$ groups in concrete and is thus able to participate in the hydration process forming a bond with the cement paste. Although the exemplary embodiments of the present disclosure is described relative to PVA, other oligomers or polymers, both synthetic and natural polymers that include functionalities which can react with hydroxide groups $(OH)^-$ groups in concrete and are thus able to participate in the hydration process forming a bond with the cement paste, may also be used.

To further increase obtainable strength and ductility of the concrete composite an exfoliation process can be applied to the clay comprising admixture. Exfoliation is a process by which small particles, such as organic ammonium chloride (OAC) or another suitable dispersant, and/or the polymer or oligomer molecules can get into the galleries of the material such as clay and cause it to expand. If desired, full exfoliation can then be induced through high shear mixing.

In one exemplary embodiment for both phosphatic and M-clay, OAC, and low molecular weight PVA oligomer is added in the following sequence:

1) OAC is added to the clay.

2a) The mixture is sheared in a high shear rate mixer (e.g. a Kady mill).

2b) If only clay is used (No PVA), the solution is then allowed to sit for 24 hours and re-mixed again at that point in time. This results in an exfoliated clay system that is ready to participate in the hydration process of cement paste/concrete in the same way as a typical pozzolan would (ex: silica fume).

3) If a PVA oligomer or other suitable oligomer/polymer in the mixture is desired, a low molecular weight PVA oligomer is added to the exfoliated clay/OAC mixture after step 2a) and the solution is sheared again.

4) The solution is allowed to sit for 24 hours, after which it is sheared in a high shear rate mixer again.

5) The resulting solution in now ready for use as an additive for either regular concrete or cement paste. This results in an exfoliated clay/PVA oligomer system that is ready to participate in the hydration process of cement paste/concrete, resulting in a modified nanostructure with improved ductility and shrinkage properties.

The amount of PVA or other suitable oligomer or polymer can be varied and is generally 1 to 6 percent by weight by total weight of concrete. The amount of clay can be varied and is generally 1 to 5 percent by weight by total weight of concrete. In one exemplary embodiment a clay/OAC/PVA solution that consists of a clay/PVA ratio: 2% clay by total weight of concrete/3 percent PVA by total weight of concrete.

The average molecular weight of the oligomeric PVA or other polymer or oligomer that include functionality which reacts with hydroxide groups $(OH)^-$ groups in concrete is preferably <1,000, and most preferably <200. Such materials can either be obtained commercially, or through a supercritical $CO_2$ processing or other process which functions to reduce the molecular weight of higher molecular materials.

The exemplary embodiments of the present disclosure provide significant advantages, such as enhanced ductility that can enhance earthquake and blasting resistance. Other advantages can include minimized pre-mature tensile cracking and temperature susceptibility. The exemplary embodiments in a foamed product application can include energy absorbent structures and protective layers and pre-made panels. The exemplary embodiments of the present disclosure can provide cost savings and design modification for building and infrastructure applications of concrete products.

The exemplary embodiments of the present disclosure can be used in a wide variety of products, such as concrete admixtures, nano-modified ductile Portland cement concrete with aggregates, nano-modified ductile cement paste, nano-modified ductile energy absorbent cement foam, such as a spray-on, or pre-batched application to structural members and structures, infrastructure and homeland security absorbent products.

As described above, in one embodiment of the invention phosphatic waste clay is used to form concrete additives, cement paste or concrete. Phosphatic waste clay is a by-product generated by the fertilizer industry when phosphorous is mined. The phosphatic waste clay is disposed of in settlement ponds, which require large areas to be taken up. Unfortunately, such ponds receive acidified leaching during the settlement which is a recognized as significantly damaging the environment. By using large quantities of phosphatic waste clay in concrete additives, cement paste and concrete, the invention will thus materially enhance the quality of the environment.

EXAMPLES

It should be understood that the Examples described below are provided for illustrative purposes only and do not in any way define the scope of the invention.

Studies into the utilization of polymer modified clay in concrete have been conducted. Table 1 below describes the six different cement paste mixtures tested and provides test results from compression testing of cylinders.

The first mix design consisted solely of Portland cement and water to act as a control mix to which the others could be compared. Adding the polymer/oligomer (PVA) modifier to the basic cement paste (Mix #2) resulted in an increased ultimate strain at failure, but also in a large decrease in strength. Adding only the clay the control mix (Mix #3), on the other hand, induced a significant increase in strength and ultimate strain. The former effect is believed to be a direct result of the pozzolanic reaction induced by the clay, an effect well known in the concrete industry.

Combining both the polymer and clay with the basic cement paste resulted in very ductile materials, depending upon the ratio of polymer to clay. A 2:1 ratio (Mix #4) increased the ultimate strain of the material by over 250%, while a 1:1 ratio (Mix #5) induced a 344% increase. However, the strength of these mixtures dropped considerably.

Upon examining the cement pastes produce in Mixes 4 and 5, it was discovered that the clay-polymer reaction required a significant amount of water, which likely resulted in insufficient water being available for proper cement hydration. Mix #6 was essentially a repeat of Mix #5, with an increased water content. The results obtained were unexpectedly highly superior, with the ultimate strength increasing dramatically while still producing double the strain exhibited by the control mix.

TABLE 1

Mixture details and compression testing results.

| Mix ID | Compounds Added | W/C Ratio | Ultimate Strength (psi) | Ultimate Strain ( ) | Elastic Modulus (ksi) |
|---|---|---|---|---|---|
| 1 | None (Control) | 0.45 | 3100 | 0.009 | 583 |
| 2 | Polymer only | 0.43 | 2500 | 0.013 | 287 |
| 3 | Clay only | 0.45 | 4047 | 0.011 | 371 |
| 4 | Poly & Clay (2:1) | 0.45 | 360 | 0.032 | 22 |
| 5 | Poly & Clay (1:1) | 0.45 | 700 | 0.040 | 36 |
| 6 | Poly & Clay (1:1) | 0.60 | 2586 | 0.018 | 283 |

Figure 3:
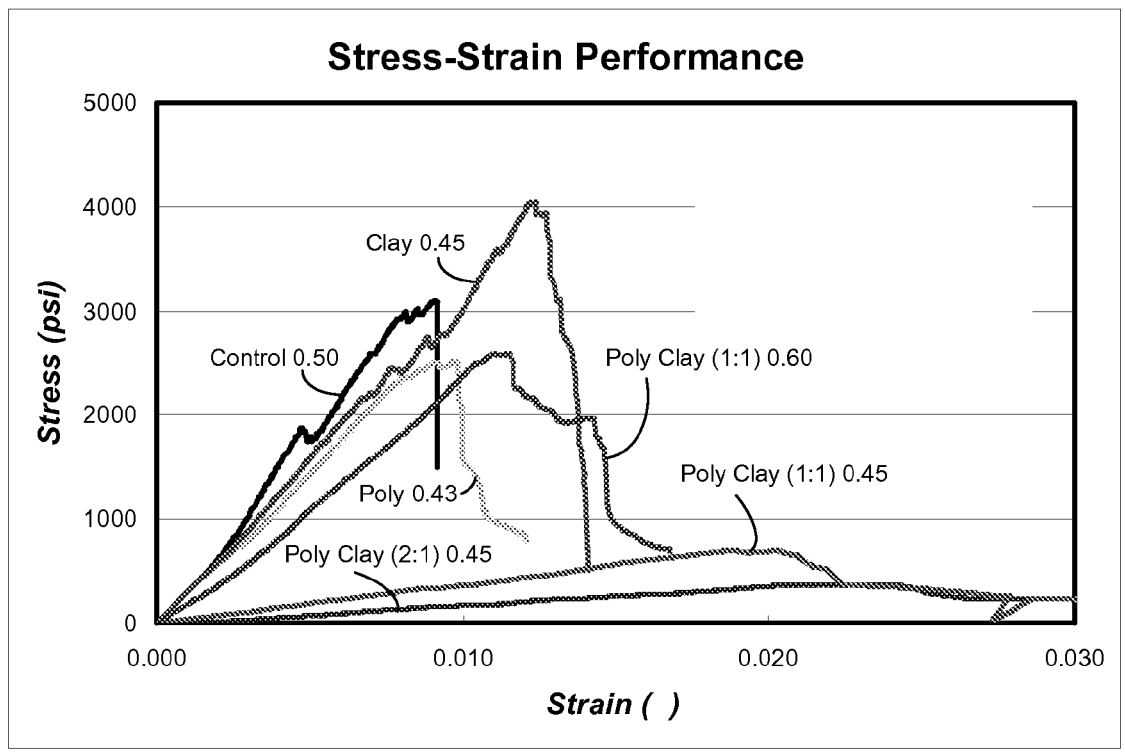
FIG. 3 depicts the stress-strain behavior exhibited by the different mixes during compression testing.

The effect of these additives can be seen even more clearly in FIG. 3, which depicts the stress-strain behavior exhibited by the different mixes during compression testing. The black line represents the control specimens (Mix #1) with neither polymer nor clay added. The cyan line represents Mix #2 wherein the polymer was added alone and the navy line shows the pozzolanic effect of the clay when added alone (Mix #3). All three of these mixes exhibit the typical concrete failure mode—extremely brittle with virtually no load carrying ability beyond the ultimate load. Essentially, the material fails instantaneously. The light and dark purple lines (Mixes 4 and 5, respectively) show the very large increases in ductility induced by combining the polymer and clay, though also show the large decrease in strength.

Finally, the red line represents Mix #6, the most promising result. The strength of this mix is nearly as high as the control and the ultimate strain has been doubled. The most important feature, however, is the behavior of the material after ultimate load. Unlike the first three mixes, there is no immediate failure after the ultimate load is reached. Instead, there is a great deal of deformation (i.e. strain) after the ultimate load is surpassed but before the failure load is reached.

This effect is unheard of in unreinforced concrete and has the potential to vastly change the design process should the amount of ductility be increased sufficiently. Additionally, the strain at which the concrete first cracks, represented by the point at which the initial linear portion of the curve ends, is much higher than the control mix. This bodes well for concrete's other job, the protection of the steel reinforcement. Essentially, a higher cracking strain would mean fewer cracks in the tension zone of concrete structural members, which would result in a lower overall permeability. Ultimately, this means that reinforced concrete exposed to seawater or other deleterious compounds would last much longer by protecting the reinforcing steel more effectively.

Such resistance to cracking will also be extremely beneficial at early ages to resist cracking due to shrinkage. Again, the microstructural fiber reinforcement provided by the polymer chains will carry most of the tensile stresses developed during shrinkage, thus resisting crack formation and propagation.

Figure 4:
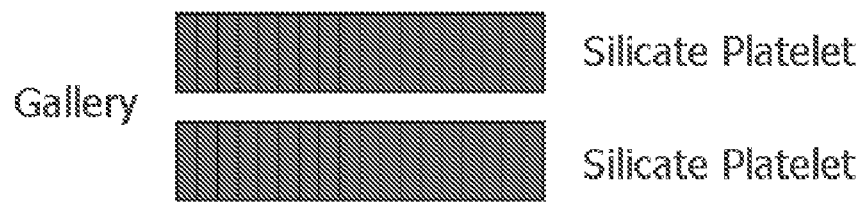
FIG. 4 shows clay platelets with a gallery therebetween.
Figure 5:
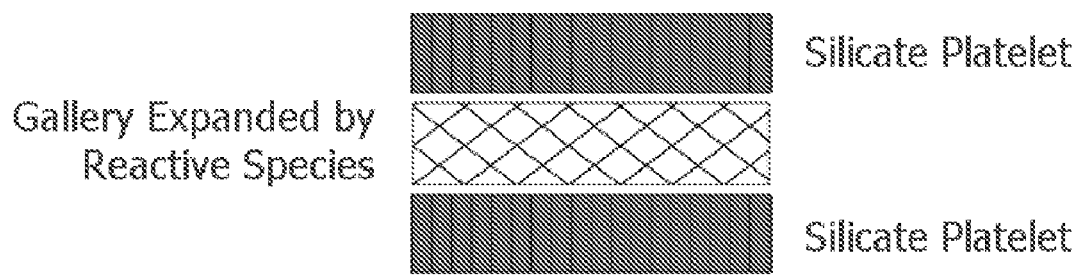
FIG. 5 shows gallery expansion of the platelets of FIG. 4.

Exfoliation leads to nanomodification. A tool that aids in the optimization of both strength and ductility is exfoliation. Exfoliation is a process by which small particles such as the organic ammonium chloride (OAC) and the oligomer or polymer molecules can get into the galleries of a material such as clay and cause it to expand. In FIG. 4, regular clay platelets are shown with the gallery between clay layers. In FIG. 5, gallery expansion occurs due to reactive species.

Figure 6:
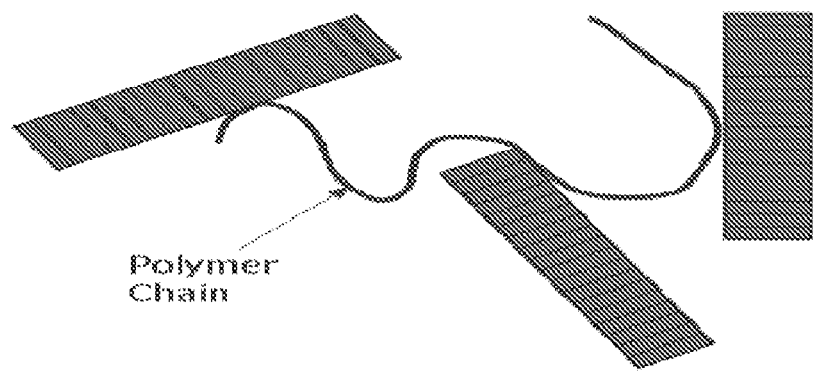
FIG. 6 shows linking of platelets through polymer chains.

Furthermore, the polymer chains help link these expanded galleries to produce a network through the concrete matrix, thereby increasing ductility. In FIG. 6, linking of platelets are assisted by polymer chains.

When phosphatic clay is used it can have a drawback. It possesses high water holding capacity due to which the water is not available for mixing purposes when added to concrete and is thus known as bound water. Thus, the calculation of bound water in phosphatic clay is generally required.

Calculation of Bound Water in Phosphatic Clay—Viscosity Measurements

The method followed to determine the amount of bound water is to measure viscosity at various solid concentration levels. At a particular solid concentration the viscosity rises steeply and the clay begins to form a solid. It is then that the rest of the water available is not present for cement hydration. This trapped water bound by the phosphatic clay should not be a part of the water to cement ratio. The DVI+Brookfield viscometer is used for the purpose.

The table 2 summarizes the viscosity results of samples at various solid concentration levels in phosphatic clay:

TABLE 2

| Concentration (wt. %) | Viscosity (cPoise) |
|---|---|
| 3 | 1600 |
| 25 | 4000 |
| 30 | 4000 |
| 35 | 10200 |
| 37 | 21000 |
| 38 | 68000 |
| 39 | 70000 |
| 40 | 180000 |

Figure 7:
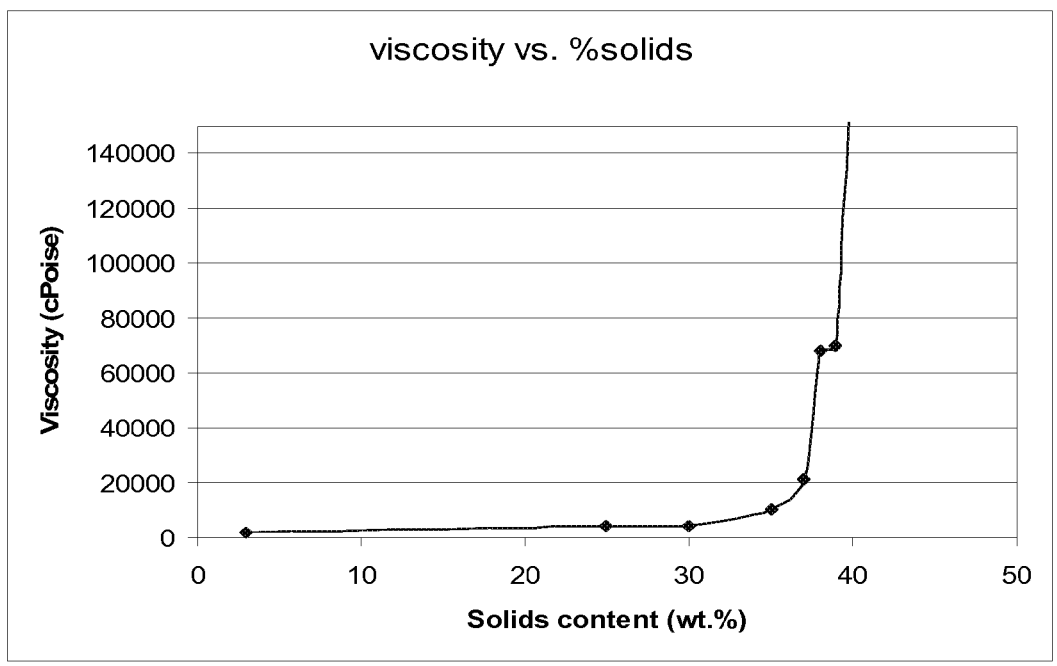
FIG. 7 is a plot of viscosity in centipoises as a function of solids content.

It can be seen from the results above and FIG. 7 that at 40% solid content the viscosity rises steeply. At this stage, there is no water available and is all bound by the clay. Thus the amount of bound water for every sample containing phosphatic clay can be determined using the fact that at 40% of its concentration, no water is available for mixing. This matter is kept in mind as concrete samples are made using phosphatic clay.

Step by Step Approach for Mixing Cement Paste Samples with Phosphatic Clay

1) Weigh a certain amount of diluted phosphatic clay sample and dry it overnight to remove the water from the sample. This will help determine the exact percent of solids in it.
2) From the same bucket of diluted phosphatic clay, take a certain amount of weight in a pan and dry it till it reaches 15% of solids. Before taking diluted clay from another bucket, make sure that the exact percent of solids for that bucket has been determined.
3) Collect this waste clay at 15% solids in another bucket till we have a good amount.
4) Weigh the correct amounts of cement and water per the mix requirements. For instance 500 grams of cement is taken for mixing, with the required water to cement ratio the required water can be achieved i.e. for 0.6 water to cement ratio, the water required will be 300 grams.
5) Now determine the exact amount of clay substitution required i.e. say if 5% substitution is required consisting of Clay and PVA (40% clay and 60% PVA in the substitution) then 25 grams will be required and the amount of cement required will now be 475 grams. The clay is exfoliated and mixed/reacted with the PVA before addition to cement paste.
6) Once this has been established, determine the amount of clay at 15% solids would be required. Like if we require 25 grams of waste clay, 166.67 grams of waste clay at 15% solids would be required.
7) Reduce the amount of water actually required for mixing by the amount of water obtained from the waste clay at 15% solids (i.e., 166.67−25=141.67 grams of water is obtained), therefore the exact amount of water required is 158.33 grams (300−141.67).
8) With the cement, reduced water and the 15% solids clay solution we are ready to mix the paste.
9) The cement is first placed in the Hobart table top mixer. Then water and the 15% solids clay mixture are added almost at the same time and the mixer is started.
10) The mixture is allowed to mix for 4-5 minutes till homogeneity is achieved. If the mixture becomes too thick to work with due to the drop in water to cement ratio, a superplaticizer called ADVA 100 by GRACE chemicals is added.
11) The mixture is then removed and put into the desired cylinders and vibrated on the vibratory table to help remove voids and help disperse the paste. This should be performed for at least 2-3 minutes.
12) The samples are then removed from the cylinders the next day and put into lime solution for curing.
13) The samples can then be tested at their required testing dates according to the required curing times.

Step by Step Procedure for Preparing Concrete Samples with all Ingredients:
1) Determine the water to cement ratio required for the samples to be prepared.
2) From the information, using the tables for medium consistency mixtures in the Portland Cement Association handbook mounts of cement, water, coarse aggregate and fine aggregate in pounds per cubic yard which can be converted to the amounts in kilograms are provided. The maximum aggregate size of the aggregate used is ¾".
3) Before using this aggregate, it should be verified that the gradation of the aggregate is in accordance to the ASTM standards. This is done the same way as for samples with Cloisite Na+.
4) Follow steps 1 to 8 for preparing cement paste samples with phosphatic clay for the achievement of required amounts of clay and cement by subtracting the amount of clay used from the amount of cement required.
5) Before we start mixing concrete, make sure that we have the required cement, the required amount of the 5% waste clay mixture, the aggregates and the remaining water.
6) First add the coarse aggregate to the mixer along with the clay mixture in water and the remaining water. Allow mixing for 2-3 minutes.
7) Then slowly add the cement to this mixture followed by the fine aggregate. Allow mixing for 4-5 minutes till homogeneity is achieved.
8) Add measured amounts of super plasticizer if the mix becomes too thick too handle. The super plasticizer to be used is ADVA 100 from GRACE chemicals.
9) Follow steps 11 to 13 from cement paste samples for completion.

For both cement paste and concrete samples, the true water to cement ratio can be calculated using the fact that at 40% solids content of phosphatic clay, there is no water available for mixing.

Compression Testing Results of Waste Clay Concrete Samples

Since the pozzolanic reaction acts to convert CH into C—S—H, producing a denser matrix and thus increasing strength, this effect is bound water in phosphatic clay expected to be more pronounced in concrete than in plain cement paste. Since CH preferentially forms in areas of high water content during hydration, and aggregate particles tend to form a film of water at their surfaces during mixing, CH typically forms along the interface between the aggregate and the surrounding hydrated cement paste matrix. It is thus this interfacial zone that ends up being the "weak link" in the concrete microstructure.

Figure 8:
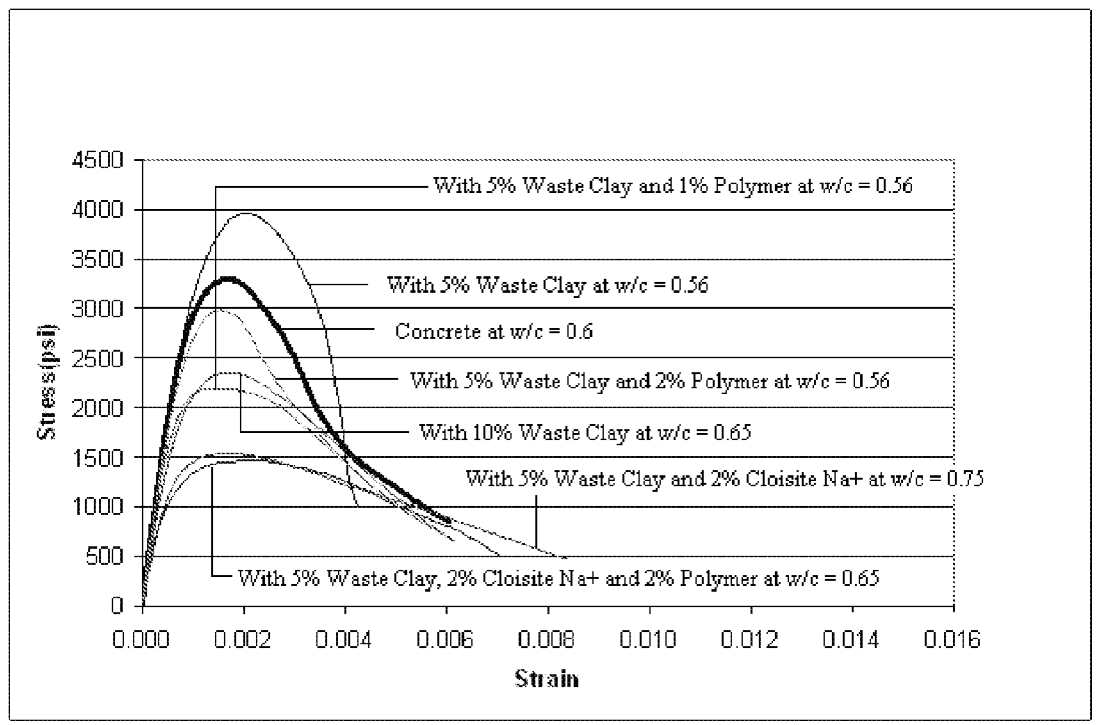
FIG. 8 is a plot of Stress vs strain for concrete samples with various ingredients after 56 days of curing.

The fact that the clay acts to convert the CH into C—S—H means that it should have more effect in concrete because it will be acting directly on this weakened transition zone, which doesn't exist in plain cement paste. To prove this theory, a series of 4"×8" concrete samples were made and tested under displacement controlled compressive loading. Following are the parameters of the testing:
Displacement rate=0.600 mm/min
Failure limit=25 mm displacement Testing Results—Exfoliated Waste Clay with Cloisite Na$^+$ and Polymer As show in the stress-strain data of FIG. 8, the addition of exfoliated waste clay by itself increases the compressive strength of samples as compared to regular concrete. There is a noticeable strength decrease with the addition of polymer and Cloisite Na$^+$ with the waste clay. The bounded water with the phosphatic clay is taken into account for the calculation of water to cement ratio for samples with the clay.

Figure 9:
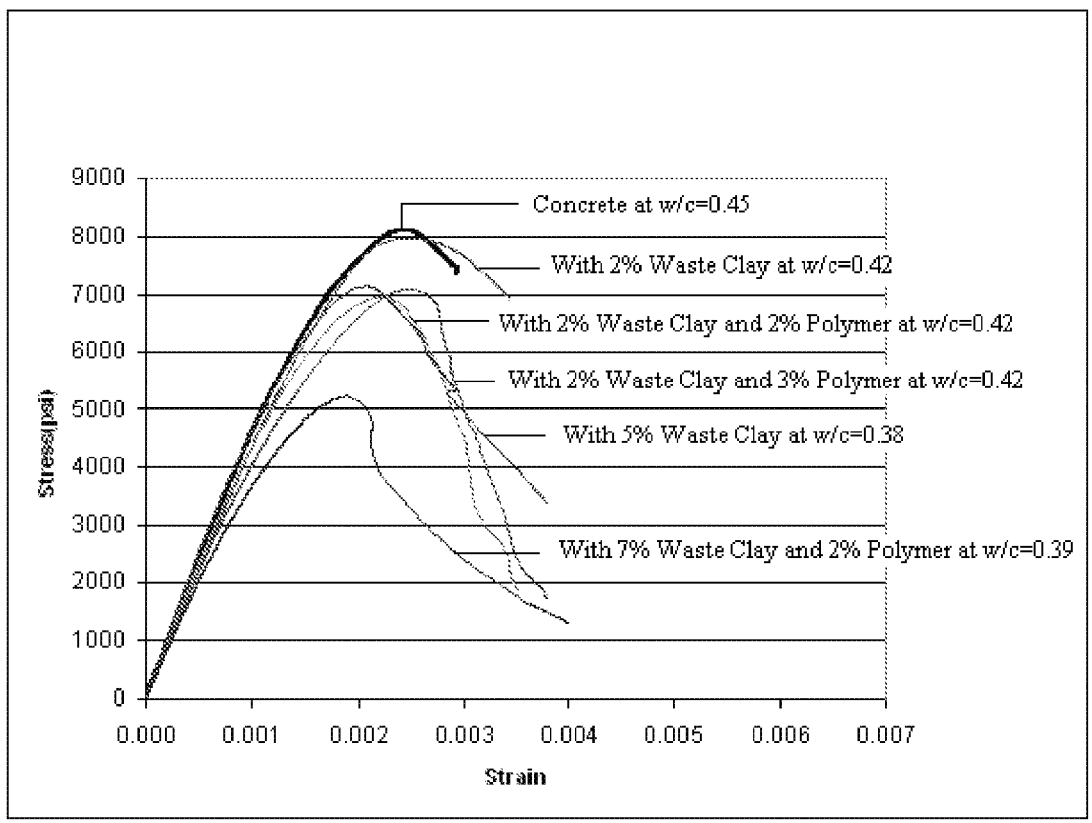
FIG. 9 is a plot of Stress vs strain for concrete samples with various ingredients after 56 days of curing.

Testing Results—Exfoliated Waste Clay with Type III Cement and Polymer for Production of High Strength Concrete As show in the stress-strain data of FIG. 9, the addition of waste clay with type III cement at 56 days yields high strength concrete. There is a reduction in compressive strength of samples with the addition of polymer and increasing amounts of waste clay. But all samples attain a compressive strength of more than 5000 psi, which makes them high strength concrete samples in accordance to the Portland Cement Association (PCA).

Characterization of Samples—Environmental Scanning Electron Microscope (ESEM) Pictures A scanning electron microscope is essentially an electron beam based microscope used to examine the surface structure of prepared specimens. The difference between a regular scanning electron microscope and an environmental scanning electron microscope is that the prior needs to be run under vacuum. In comparison, the environmental scanning electron microscope permits scanning microscopy at much lower pressures in the presence of a gas.

Various images have been recorded for samples with varying concentrations of ingredients in concrete and the Interfacial Transition Zone between the paste and the aggregate has been studied. It was observed that better packing with the aggregate is observed as compared to a sample with 2% Polymer. It was concluded that samples with the addition of phosphatic clay and polymer produce better contact with the aggregate leading to better concrete characteristics as there is a reduction of weak zones between the paste and aggregate.

Other features of the present disclosure are recited in "Nanomodification of Hydrate Portland Cement Concrete Paste" by Birgisson et al. and "Summary of Research on the utilization of nanomodified phosphatic clay" by Birgisson et al., the disclosures of which are hereby incorporated by reference It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

The invention claimed is:

1. A reinforced concrete composite, comprising:
   a cement matrix;
   an exfoliated clay having an exfoliated layered silicate plate comprising structure, and
   at least one of an oligomer or polymer linking at least a portion of said silicate plate comprising structure; wherein an average spacing of said silicate plates is at least 4 nm.

2. The concrete composite of claim 1, wherein said oligomer or polymer comprises polyvinyl alcohol (PVA).

3. The concrete composite of claim 2, wherein an average molecular weight of said PVA is less than 1,000.

4. The concrete composite of claim 1, wherein said oligomer or polymer comprises 1 to 6 percent by weight of said concrete and said clay comprises 1 to 5 percent by weight of said concrete.

5. The concrete composite of claim 1, further comprising at least one dispersing agent.

6. The concrete composite of claim 1, wherein said cement is Portland cement.

7. The concrete composite of claim 1, wherein said clay comprises sodium montmorillonite or a phosphatic clay.

8. A concrete additive, comprising:
   a stable mixture including:
   an exfoliated clay having an exfoliated layered silicate plate comprising structure, and
   a dispersant between said silicate plates; wherein an average spacing of said silicate plates is at least 4 nm.

9. The additive of claim 8, wherein said dispersant comprises organic ammonium chloride (OAC).

10. The additive of claim 8, further comprising at least one of an oligomer or polymer linking at least a portion of said silicate plate comprising structure.

11. The additive of claim 8, wherein said clay comprises sodium or calcium montmorillonite or a phosphatic clay.

12. A method of reinforcing a concrete composite, the method comprising:
    providing a cement matrix;
    admixing an exfoliated clay to the cement matrix, wherein the exfoliated clay has an exfoliated layered silicate plate comprising structure; and linking at least a portion of said silicate plate comprising structure using an oligomer or polymer; wherein an average spacing of said silicate plates is at least 4 nm.

13. The method of claim 12, wherein said oligomer or polymer comprises Polyvinyl alcohol (PVA).

14. The method of claim 13, wherein an average molecular weight of said PVA is <1,000.

15. The method of claim 12, wherein said oligomer or polymer comprises 1 to 6 percent by weight of said concrete composite and said clay comprises 1 to 5 percent by weight of said concrete composite.

16. The method of claim 12, wherein said clay comprises sodium montmorillonite or a phosphatic clay.

17. The method of claim 12, further comprising providing a dispersant between said silicate plates, wherein said dispersant comprises organic ammonium chloride (OAC).

* * * * *